(12) United States Patent
Teasley

(10) Patent No.: US 6,380,327 B1
(45) Date of Patent: Apr. 30, 2002

(54) CHAIN TRANSFER AGENTS FOR OLEFIN POLYMERIZATION

(75) Inventor: Mark F Teasley, Landenberg, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/707,306

(22) Filed: Nov. 7, 2000

Related U.S. Application Data

(60) Provisional application No. 60/165,265, filed on Nov. 12, 1999.

(51) Int. Cl.[7] .............................. C08F 2/38; C08F 4/44; C08F 10/04
(52) U.S. Cl. .................. 526/89; 526/115; 526/116; 526/117; 526/161; 526/172; 526/348; 502/117; 502/155
(58) Field of Search ................................. 526/161, 172, 526/348, 89, 115, 116, 117; 502/117, 155

(56) References Cited

U.S. PATENT DOCUMENTS

| | | |
|---|---|---|
| 5,714,556 A | 2/1998 | Johnson et al. |
| 5,880,241 A | 3/1999 | Brookhart et al. |
| 6,103,658 A | 8/2000 | Mackenzie et al. |
| 6,320,005 B1 * | 11/2001 | Murray ....................... 526/161 |

FOREIGN PATENT DOCUMENTS

| | | |
|---|---|---|
| WO | WO 99/61492 | 12/1999 |
| WO | WO 00/06620 | 2/2000 |

* cited by examiner

*Primary Examiner*—David W. Wu
*Assistant Examiner*—R. Harlan

(57) ABSTRACT

1,4-Cyclohexadienes and triarylmethanes are chain transfer agents for certain late transition metal complex catalyzed polymerizations of olefins.

22 Claims, No Drawings

CHAIN TRANSFER AGENTS FOR OLEFIN POLYMERIZATION

CROSS-REFERENCE TO RELATED APPLICATION

This application claims priority under 35 U.S.C. §119 from U.S. Provisional Application Ser. No. 60/165,265 (filed Nov. 12, 1999), which is incorporated by reference herein for all purposes as if fully set forth.

FIELD OF THE INVENTION 1,4-Cyclohexadienes and triarylmethanes act as chain transfer agents ("CTA") in the polymerization of olefins in which late transition metal complexes of neutral bidentate ligands are used as a polymerization catalyst.

TECHNICAL BACKGROUND

Polymerization of olefins using early transition metal containing catalysts such as vanadium and zirconium is a well known and commercially important technology. In many instances it is desirable to lower the molecular weight of the polyolefin that would normally be produced. For example lower molecular weight polymers are usually considered easier to melt process, since they have lower melt viscosities. While polymerization process conditions can sometimes be altered to change the molecular weight of the resulting polyolefin, often a CTA such as hydrogen is deliberately added to the process to lower the polyolefin molecular weight.

The polymerization of olefins using late transition metal containing catalysts such as nickel with selected neutral bidentate ligands is known, see for instance U.S. Pat. Nos. 5,714,556, 5,880,241, 6,103,658 and WO00/06620 (corresponding to U.S. patent application Ser. No. 09/362432, filed Jul. 28, 1999), all of which are incorporated by reference herein for all purposes as if fully set forth. Methods for lowering the molecular weight of polyolefins produced in such processes are known. However, the CTAs that have been reported, such as hydrogen, are not very efficient and often tend to reduce the productivity of the polymerization catalyst. Since these processes often give polyolefins with unique and valuable structures, improved methods for controlling the polymer molecular weight are desirable.

WO99/61492 (corresponding to U.S. patent application Ser. No. 09/317,557, filed May 24, 1999), also incorporated by reference herein for all purposes as if fully set forth, describes the use of hydrogen and other types of compounds as CTAs for late metal transition complexes of bidentate ligands as polymerization catalysts. No mention is made of the use of the compounds described herein as CTAs.

SUMMARY OF THE INVENTION

This invention concerns a process for the polymerization of one or more polymerizable olefins, comprising the step of contacting, under polymerization conditions:
(a) said one or more polymerizable olefins and
(b) an active polymerization catalyst comprising a complex of a neutral bidentate ligand of a metal selected from the group consisting of nickel, iron and cobalt,
in the presence of a chain transfer agent comprising a compound selected from the group consisting of a compound of the formula (I)

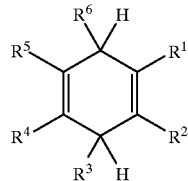
(I)

and a triarylmethane of the formula $R^7_3CH$ (II), wherein:
each of $R^1$, $R^2$, $R^3$, $R^4$, $R^5$ and $R^6$ is independently hydrogen, hydrocarbyl, or substituted hydrocarbyl, provided that any two of $R^1$, $R^2$, $R^3$, $R^4$, $R^5$ and $R^6$ vicinal to one another taken together may form a ring; and
each $R^7$ is independently aryl or substituted aryl, provided that any two of $R^7$ taken together may form a ring.

In another form, this invention concerns an improved process for the polymerization of one or more polymerizable olefins in the presence of, as an active polymerization catalyst, a complex of a neutral bidentate ligand of a metal selected from the group consisting of nickel, iron and cobalt, and further in the presence of an effective amount of a chain transfer agent, wherein the improvement comprises using as a chain transfer agent a compound selected from the group consisting of a compound of the formula (I)

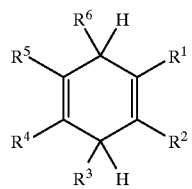
(I)

and a triarylmethane of the formula $R^7_3CH$ (II), wherein:
each of $R^1$, $R^2$, $R^3$, $R^4$, $R^5$ and $R^6$ is independently hydrogen, hydrocarbyl, or substituted hydrocarbyl, provided that any two of $R^1$, $R^2$, $R^3$, $R^4$, $R^5$ and $R^6$ vicinal to one another taken together may form a ring; and
each $R^7$ is independently aryl or substituted aryl, provided that any two of $R^7$ taken together may form a ring.

This invention also concerns a process for the polymerization of one or more polymerizable olefins, comprising the step of contacting:
(a) said one or more polymerizable olefins;
(b) an effective amount of a chain transfer agent selected from the group consisting of

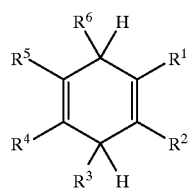
(I)

and a triarylmethane of the formula $R^7_3CH$ (II);
(c) an active polymerization catalyst which contains a nickel, iron or cobalt complex of a ligand of the formula (IV), (V), (VI) or (VII)

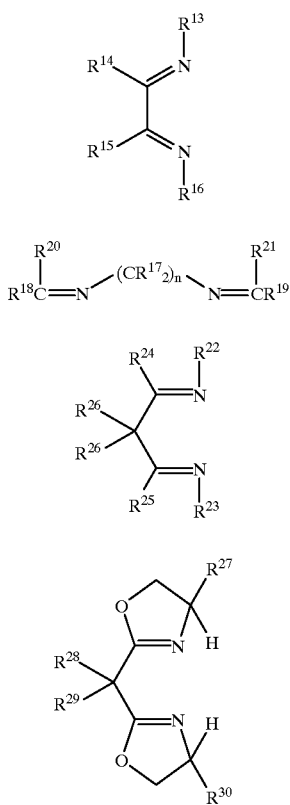

wherein:
  each of $R^1$, $R^2$, $R^3$, $R^4$, $R^5$ and $R^6$ is independently hydrogen, hydrocarbyl, or substituted hydrocarbyl, provided that any two of $R^1$, $R^2$, $R^3$, $R^4$, $R^5$ and $R^6$ vicinal to one another taken together may form a ring;
  each $R^7$ is independently aryl or substituted aryl, provided that any two of $R^7$ taken together may form a ring;
  $R^{13}$ and $R^{16}$ are each independently hydrocarbyl or substituted hydrocarbyl, provided that the atom bound to the imino nitrogen atom has at least two carbon atoms bound to it;
  $R^{14}$ and $R^{15}$ are each independently hydrogen, hydrocarbyl, substituted hydrocarbyl, or $R^{14}$ and $R^{15}$ taken together are hydrocarbylene or substituted hydrocarbylene to form a carbocyclic ring;
  $R^{18}$ is hydrocarbyl or substituted hydrocarbyl, and $R^{20}$ is hydrogen, hydrocarbyl or substituted hydrocarbyl or $R^{18}$ and $R^{20}$ taken together form a ring;
  $R^{19}$ is hydrocarbyl or substituted hydrocarbyl, and $R^{21}$ is hydrogen, substituted hydrocarbyl or hydrocarbyl, or $R^{19}$ and $R^{21}$ taken together form a ring;
  each $R^{17}$ is independently hydrogen, substituted hydrocarbyl or hydrocarbyl, or two of $R^{17}$ taken together form a ring;
  $R^{22}$ and $R^{23}$ are each independently hydrocarbyl or substituted hydrocarbyl, provided that the atom bound to the imino nitrogen atom has at least two carbon atoms bound to it;
  $R^{24}$ and $R^{25}$ are each independently hydrogen, hydrocarbyl, or substituted hydrocarbyl;
  each $R^{26}$ is independently hydrogen, hydrocarbyl or substituted hydrocarbyl;
  $R^{27}$ and $R^{30}$ are independently hydrocarbyl or substituted hydrocarbyl; and
  $R^{28}$ and $R^{29}$ are each independently hydrogen, hydrocarbyl or substituted hydrocarbyl.

DETAILED DESCRIPTION OF THE PREFERRED EMBODIMENTS

Herein, certain terms are used. Some of them are:

A "hydrocarbyl group" is a univalent group containing only carbon and hydrogen. As examples of hydrocarbyls may be mentioned unsubstituted alkyls, cycloalkyls and aryls. If not otherwise stated, it is preferred that hydrocarbyl groups herein contain 1 to about 30 carbon atoms.

By "saturated hydrocarbyl" is meant a univalent radical that contains only carbon and hydrogen, and contains no carbon-carbon double bonds, triple bonds and aromatic groups.

By "substituted hydrocarbyl" herein is meant a hydrocarbyl group that contains one or more substituent groups which are inert under the process conditions to which the compound containing these groups is subjected (e.g., an inert functional group, see below). The substituent groups also do not substantially detrimentally interfere with the polymerization process or operation of the polymerization catalyst system. If not otherwise stated, it is preferred that substituted hydrocarbyl groups herein contain 1 to about 30 carbon atoms. Included in the meaning of "substituted" are chains or rings containing one or more heteroatoms, such as nitrogen, oxygen and/or sulfur, and the free valence of the substituted hydrocarbyl may be to the heteroatom. In a substituted hydrocarbyl, all of the hydrogens may be substituted, as in trifluoromethyl.

By "(inert) functional group" herein is meant a group, other than hydrocarbyl or substituted hydrocarbyl, that is inert under the process conditions to which the compound containing the group is subjected. The functional groups also do not substantially interfere with any process described herein that the compound in which they are present may take part in. Examples of potential functional groups include halo, ester, keto (oxo), amino, imino, carboxyl, phosphite, phosphonite, phosphine, phosphinite, thioether, amide, nitrile, and ether. Preferred functional groups are halo, ester, amino, imino, carboxyl, phosphite, phosphonite, phosphine, phosphinite, thioether, and amide. Particularly preferred examples of functional groups include halo (fluoro, chloro, bromo and iodo) and ether such as —$OR^{60}$, wherein $R^{60}$ is hydrocarbyl or substituted hydrocarbyl. Which substituents are useful in which polymerizations may in some cases be determined by reference to previously incorporated U.S. Pat. No. 5,714,556, 5,880,241, 6,103,658 and WO00/06620. In cases in which the functional group may be near the transitional metal atom, the functional group should not coordinate to the metal atom more strongly than the groups in those compounds are shown as coordinating to the metal atom, that is they should not displace the desired coordinating group.

By "(substituted) hydrocarbylene" is meant a group analogous to (substituted) hydrocarbyl, except the radical is divalent.

By "aryl" is meant a monovalent aromatic group in which the free valence is to the carbon atom of an aromatic ring. An aryl may have one or more aromatic rings which may be fused, connected by single bonds or other groups.

By "phenyl" is meant the $C_6H_5$— radical, and a "phenyl moiety" or "substituted phenyl" is a radical in which one or more of the hydrogen atoms is replaced by a substituent group (which may include hydrocarbyl).

By "substituted aryl" is meant a monovalent aromatic group substituted as set forth in the above definition of "substituted hydrocarbyl". Similar to an aryl, a substituted aryl may have one or more aromatic rings which may be fused, connected by single bonds or other groups; however, when the substituted aryl has a heteroaromatic ring, the free valence in the substituted aryl group can be to a heteroatom (such as nitrogen) of the heteroaromatic ring instead of a carbon.

If not otherwise stated, hydrocarbyl, substituted hydrocarbyl and all other groups containing carbon atoms, such as alkyl, preferably contain 1 to 20 carbon atoms.

By a "neutral bidentate ligand" is meant a bidentate ligand that has no charge on the ligand (is not ionic in a formal sense if not coordinated to the transition metal).

By "olefin" is meant a compound containing one or more olefinic double bonds. In the event that the compound contains more than one olefinic double bond, they should be non-conjugated. As examples of olefins may be mentioned cyclopentene, a styrene, a norbornene, and compounds of the formulas $R^{70}CH=CH_2$ and $H_2C=CH(CH_2)_sCO_2R^{71}$, wherein $R^{70}$ is hydrogen or alkyl, $R^{71}$ is hydrocarbyl or substituted hydrocarbyl; and s is 0 or an integer of from 1 to 20.

By a "styrene" is meant a compound of the formula (XXXIX)

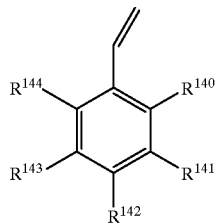

herein $R^{140}$, $R^{141}$, $R^{142}$, $R^{143}$ and $R^{144}$ are each independently hydrogen, hydrocarbyl, substituted hydrocarbyl or a functional group, all of which are inert in the polymerization process. It is preferred that all of $R^{140}$, $R^{141}$, $R^{142}$, $R^{143}$ and $R^{144}$ are hydrogen. Styrene (itself) is a preferred styrene.

By a "norbornene" is meant ethylidene norbornene, dicyclopentadiene, or a compound of the formula (XXXX)

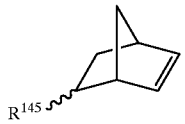

wherein $R^{145}$ is hydrogen or hydrocarbyl containing 1 to 20 carbon atoms. It is preferred that $R^{145}$ is hydrogen or alkyl, more preferably hydrogen or n-alkyl, and especially preferably hydrogen. The norbornene may be substituted by one or more hydrocarbyl, substituted hydrocarbyl or functional groups in the $R^{145}$ or other positions, with the exception of the vinylic hydrogens, which remain. Norbornene (itself), dimethyl endo-norbornene-2,3-dicarboxylate, t-butyl 5-norbornene-2-carboxylate are preferred norbornenes and norbornene (itself) is especially preferred.

"Noncoordinating" ions are mentioned and useful herein. By "noncoordinating" (or "relatively noncoordinating" or "weakly coordinating") anions are meant those anions as are generally referred to in the art in this manner, and the coordinating ability of such anions is known and has been discussed in the literature. See, for instance, W. Beck et al., *Chem. Rev.*, vol. 88, pp. 1405–1421 (1988), and S. H. Strauss, *Chem. Rev.*, vol. 93, pp. 927–942 (1993), both of which are hereby included by reference. Among such anions are those formed from aluminum compounds (such as those described in the immediately preceding paragraph) and $X^-$ (an anion as discussed in further detail below), including $(R^{19})_3AlX^-$, $(R^{19})_2AlClX^-$, $R^{19}AlCl_2X^-$, and $R^{19}AlOX^-$, wherein $R^{19}$ is alkyl. Other useful noncoordinating anions include $BAF^-$ {BAF=tetrakis[3,5-bis(trifluoromethyl)phenyl]borate}, $SbF_6^-$, $PF_6^-$, and $BF_4^-$, trifluoromethanesulfonate, p-toluenesulfonate, $(R_fSO_2)_2N^-$, and $(C_6F_6)_4B^-$.

A neutral Lewis acid or a cationic Lewis or Bronsted acid whose counterion is a weakly coordinating anion may also be present as part of the catalyst system. By a "neutral Lewis acid" is meant a compound that is a Lewis acid capable of abstracting an anion from a late transition metal compound to form a weakly coordination anion. The neutral Lewis acid is originally uncharged (i.e., not ionic). Suitable neutral Lewis acids include $SbF_5$, $Ar_3B$ (wherein Ar is aryl), and $BF_3$. By a cationic Lewis acid is meant a cation with a positive charge such as $Ag^+$, $H^+$ and $Na^+$.

In many of those instances in which the transition metal compound does not contain an alkyl or hydride group already bonded to the metal, the neutral Lewis acid or a cationic Lewis or Bronsted acid also alkylates or adds a hydride to the metal, i.e., causes an alkyl group or hydride to become bonded to the metal atom, or a separate (from W) compound is added to add the alkyl or hydride group.

A preferred neutral Lewis acid, which can alkylate the metal, is a selected alkyl aluminum compound, such as $R^9_3Al$, $R^9_2AlCl$, $R^9AlCl_2$, $(R^9AlCl)_2O$, and "$R^9AlO$" (alkylaluminoxanes), wherein $R^9$ is alkyl containing 1 to 25 carbon atoms, preferably 1 to 4 carbon atoms. Suitable alkyl aluminum compounds include methylaluminoxane (which is an oligomer with the general formula $[MeAlO]_n$), $(C_2H_5)_2AlCl$, $C_2H_5AlCl_2$, $[CH_3)_2CHCH_2AlCl]_2O$, and $[(CH_3)_2CHCH_2]_3Al$. Metal hydrides such as $NaBH_4$ may be used to bond hydride groups to the metal M.

For (IV) through (VII) preferred formulas and compounds (as ligands for polymerization catalysts) are found in previously incorporated U.S. Pat. Nos. 5,880,241, 6,103,658 and WO00/06620, and preferred grouping and compounds in this publication are also preferred herein. However the compound numbers and group (i.e., $R^x$) numbers in these publications may vary from those herein, but they are readily convertible. These publications also describes synthesis of the various ligands.

A particularly preferred ligand is an alpha-diimine ligand, and especially ligand (IV). In (IV) is it preferred that $R^{14}$ and $R^{15}$ taken together are an acenapthene moiety.

There are many different ways of preparing active polymerization catalysts of transition metal coordination compounds of compounds as described herein, many of which are described in previously incorporated U.S. Pat. Nos. 5,714,556, 5,880,241, 6,103,658 and WO00/06620, and those so described are applicable herein. "Pure" compounds which themselves may be active polymerization catalysts may be used, or the active polymerization catalyst may be prepared in situ by a variety of methods.

For instance, olefins may be polymerized by contacting, at a temperature of about –100° C. to about +200° C. a first compound W, which is a neutral Lewis acid capable of abstracting an anion to form a weakly coordinating anion; or a cationic Lewis or Bronsted acid whose counterion is a weakly coordinating anion; a second compound such as

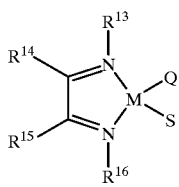

(VIII)

and one or more polymerizable olefins wherein:
M is an appropriate transition metal;
$R^{13}$ through $R^{16}$ are as defined above,
Q is a monoanion, preferably alkyl, hydride, chloride, iodide, or bromide; and
S is a monoanion, preferably alkyl, hydride, chloride, iodide, or bromide.

In this instance it is preferred that W is an alkyl aluminum compound. Other methods for preparing active polymerization catalyst will be found in previously incorporated U.S. Pat. Nos. 5,714,556, 5,880,241, 6,103,658 and WO00/06620, and in the Examples herein.

Which active polymerization catalysts will polymerize which olefins (not all catalysts will polymerize all olefins or combinations of olefins) will also be found in previously incorporated U.S. Pat. Nos. 5,714,556, 5,880,241, 6,103,658 and WO00/06620. Monomers useful herein include ethylene, propylene, other α-olefins of the formula $R^{150}$CH=$CH_2$, wherein $R^{150}$ is n-alkyl containing 2 to about 20 carbon atoms, cyclopentene, a styrene, and a norbornene. Preferred monomers are ethylene, propylene and cyclopentene, and ethylene is especially preferred.

For all polymerization catalysts, where applicable, nickel is a preferred transition metal.

One of the CTAs herein is (I), which is 1,4-cyclohexadiene or one of its derivatives. Useful compounds (I) include the compound in which:
$R^1$, $R^2$, $R^3$, $R^4$, $R^5$ and $R^6$ are all hydrogen;
one or two of $R^1$, $R^2$, $R^3$, $R^4$, $R^5$ and $R^6$ is alkyl, more preferably alkyl containing 1 to 4 carbon atoms, and especially preferably methyl, and the rest are hydrogen;
$R^1$ and $R^2$ taken together form a benzene ring, and all of $R^2$, $R^3$, $R^4$, $R^5$ and $R^6$ are hydrogen (compound is 1,4-dihydronaphthalene); or
$R^1$ and $R^2$, and $R^4$ and $R^5$, each pair taken together form a benzene ring, and $R^3$ and $R^6$ are hydrogen (compound is 9,10-dihydroanthracene).

Compound (II) is a triarylmethane, that is, a trisubstituted (tertiary) methane containing three aryl substituents. In (II) it is preferred that each $R^7$ is independently aryl or hydrocarbyl substituted aryl, more preferably aryl, and especially preferably every $R^7$ is phenyl (compound is triphenylmethane). When $R^7$ taken together may form a ring, a compound such as 9-phenylfluorene is contemplated.

The CTAs are used herein in an "effective amount"; that is, an amount required to lower the molecular weight of the resulting polymer in comparison to a polymer identically produced but without the specified CTA. Like most CTAs, the amount of reduction in polymer molecular weight obtained depends upon the concentration of CTA used, but unlike virtually all other CTAs, it has been surprisingly found that lower concentrations of one of the CTAs used herein may actually result in a lower molecular weight and, vice versa, higher concentrations may not result in as great a molecular weight reduction. This is clearly evident from many of the Examples herein, for instances comparing Examples 1–3, and Examples 4–6. One useful molar range of CTA to transition metal (such as Ni) in the catalyst is about 1 to about 100,000, more preferably about 5 to about 20,000, and especially preferably about 100 to about 1000, depending on the particular polymerization process, the CTA used, and other factors such as the monomer (if it is a gas) pressure. The efficacy of any particular CTA under any set of polymerization process conditions (temperature, catalyst used, monomer(s) used, monomer concentration, etc.) can readily be determined by minimal routine experimentation, using the Examples herein as a starting point, and the desired molecular weight range may be readily reached.

It is also known that the polymerization described herein lead to polymers that have an "abnormal" number and types of branches, see for instance previously incorporated U.S. Pat. Nos. 5,714,556, 5,880,241, 6,103,658 and WO00/06620. For example, in the production of polyethylene a polymer may be produced that has some or a great deal of branches of varying length, sometimes also containing "branches-on-branches". This is in comparison to most polyethylenes made by coordination polymerization which have little or no branching. It has surprisingly been found that the addition of the CTAs herein not only modifies the molecular weight of the polymer, but also usually increases the branching level of the polyolefin, sometimes substantially. Thus these CTAs may also be used to increase the branching level of a polymer made under a certain set of polymerization conditions.

The polymerization processes herein may be run in the presence of various liquids, particularly aprotic organic liquids. The catalyst system, monomer(s), and polymer may be soluble or insoluble in these liquids, but obviously these liquids should not prevent the polymerization from occurring. Suitable liquids include alkanes, cycloalkanes, selected halogenated hydrocarbons, and aromatic hydrocarbons. Specific useful solvents include hexane, toluene, benzene, heptane, isooctane, methylene chloride, and 1,2,4-trichlorobenzene.

The olefin polymerizations herein may also initially be carried out in the "solid state" by, for instance, supporting the transition metal compound on a substrate such as silica or alumina, activating if necessary it with one or more cocatalysts and contacting it with the olefin(s). Alternatively, the support may first be contacted (reacted) with one or more cocatalysts (if needed) such as an alkylaluminum compound, and then contacted with an appropriate transition metal compound. The support may also be able to take the place of a Lewis or Bronsted acid, for instance an acidic clay such as montmorillonite, if needed. Another method of making a supported catalyst is to start a polymerization or at least make a transition metal complex of another olefin or oligomer of an olefin such as cyclopentene on a support such as silica or alumina. These "heterogeneous" catalysts may be used to catalyze polymerization in the gas phase or the liquid phase. By gas phase is meant that a gaseous olefin is transported to contact with the catalyst particle.

More than one (transition metal containing) polymerization catalyst may be present in the process. These catalysts include early metal containing polymerization catalysts such as Ziegler-Natta-type and metallocene-type catalysts as well as later metal transition catalysts. At least one (and optionally more than one) late metal transition catalyst as described above must be present, but other types of late transition metal containing catalysts may also be present. See, for example, previously incorporated U.S. Pat. No. 5,880,241, as well as U.S. Pat. No. 5,955,555, WO99/10391, WO97/38024, WO97/48735, WO98/38228, WO99/46302 and WO99/50318, also incorporated by reference herein for all purposes as if fully set forth.

In all of the polymerization processes described herein oligomers and polymers of the various olefins are made. These oligomers or polymers may be homooligomers or homopolymers, or cooligomers or copolymers, or a combination of both, depending on which and how many olefins polymerization catalysts are present in the polymerization process. They may range in molecular weight from oligomeric olefins, to lower molecular weight oils and waxes, to higher molecular weight polyolefins. One preferred product is a polymer with a degree of polymerization (DP) of about 10 or more, preferably about 40 or more. By "DP" is meant the average number of repeat (monomer) units in a polymer molecule.

Depending on their properties, the polymers made by the processes described herein are useful in many ways. For instance if they are thermoplastics, they may be used as molding resins, for extrusion, films, etc. If they are elastomeric, they may be used as elastomers. If they are lower viscosity liquids they may be used as lubricants.

Depending on the process conditions used and the polymerization catalyst system chosen, polymers, even those made from the same monomer(s) may have varying properties. Some of the properties that may change are molecular weight and molecular weight distribution, crystallinity, melting point, and glass transition temperature. Except for molecular weight and molecular weight distribution, branching can affect all the other properties mentioned, and branching may be varied (using the same transition metal compound) using methods described in previously incorporated U.S. Pat. No. 5,880,241.

In the Examples except where noted all pressures are gauge pressures. The following abbreviations are used:

CHD—1,4-cyclohexadiene

GPC—gel permeation chromatography

MI—melt index (at 190° C. and a weight of 2160 g)

Mn—number average molecular weight

Mw—weight average molecular weight

PE—polyethylene

Tm—melting point

In the Examples condensed materials were handled in a nitrogen-purged glove box. Ethylene (Research Grade, 99.5%) and nitrogen (99.998%) were supplied by MG Industries. Heptane, isooctane, and dichloromethane (anhydrous, Aldrich Chemical Co. Milwaukee, Wis., U.S.A.) were filtered through basic alumina (activity I). 1,4-Cyclohexadiene (97%, Aldrich Chemical Co. Milwaukee, Wis., U.S.A.) was filtered through basic alumina (activity I). Modified methylaluminoxane-type 7, MMAO-7 (12.8 wt % Al in Isopar® E isoparaffin solvent from Exxon Corp. with a boiling point range of 118–137° C., and a specific gravity of 0.722) was supplied by Akzo Nobel.

The polymerizations were carried out using various late transition metal compounds, made according to procedures described in previously incorporated U.S. Pat. No. 5,880,241. They were:

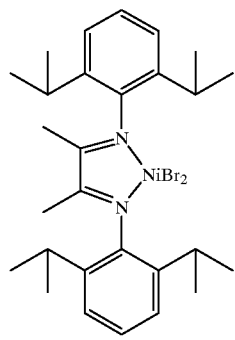

(IX)

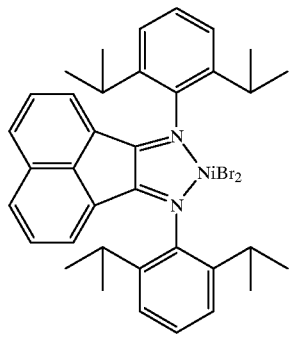

(X)

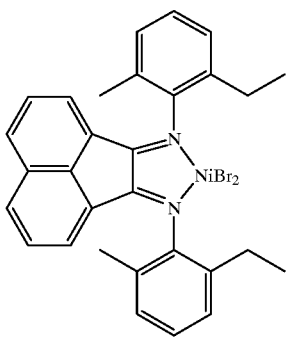

(XI)

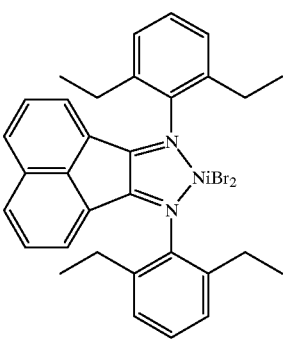

(XII)

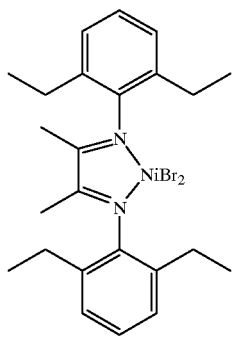

(XIII)

EXAMPLES 1–16 AND COMPARATIVE EXAMPLES A–K

General Polymerization Procedure

A 600 mL pressure reactor equipped with a stirrer (600 rpm) and a 30 mL addition cylinder was used for the ethylene slurry polymerizations. The reactor was dried and purged at 130° C. by cycling between nitrogen (1.72 MPa) and vacuum (800 Pa absolute) three times, then cooled to ambient temperature under nitrogen (1.72 MPa).

MMAO-7 (0.6 mL, 2.3 mmol Al) and 1,4-cyclohexadiene were dissolved in heptane (300 mL) in a glass bottle and sealed with a septum. The charging cannula from the reactor was back purged using the nitrogen and inserted into the glass bottle. An ethylene make-up gas line (14 kPa) was inserted into the glass bottle, the reactor was evacuated, and the heptane solution was charged to the reactor under ethylene. The reactor was equilibrated at the desired temperature and ethylene pressure. (XII) was dissolved in dichloromethane (10 mL) in a glass vial, activated by addition of MMAO-7 (0.1 mL, 0.4 mmol Al), and the vial was sealed with a septum. The charging cannula from the addition cylinder was back purged using nitrogen and inserted into the vial. A nitrogen make-up gas line (14 kPa) was inserted into the vial. The addition cylinder was evacuated and the catalyst solution was charged to the addition cylinder under nitrogen.

The ethylene polymerization was initiated by charging the catalyst solution to the reactor using a slight over-pressure of nitrogen. The ethylene uptake was monitored by measuring the pressure drop from a gas reservoir. The polymerization was terminated by injecting methanol from the addition cylinder. The polyethylene was collected by vacuum filtration, washed with methanol, and dried at 70° C. in a nitrogen-purged vacuum oven.

Example 1

This example demonstrates the activation of the catalyst in solution prior to charging to the polymerization reactor.

MMAO-7 (0.6 mL, 2.3 mmol Al) and 1,4-cyclohexadiene (1.0 mL, 10.6 mmol, 4400 equivalents per Ni) were dissolved in heptane (300 mL), and charged to the reactor. The reactor was equilibrated to 50° C. and 1.24 MPa ethylene. (XII) (1.6 mg, 2.4 $\mu$mol) was dissolved in dichloromethane (10 mL) and activated by addition of MMAO-7 (0.1 mL, 0.4 mmol Al, 1100 total equivalents Al per Ni), then charged to the addition cylinder using nitrogen. The polymerization was initiated by injecting the catalyst solution using nitrogen to bring the final reactor pressure to 1.38 MPa. The temperature rose to an average of 56° C., which was maintained for about 48 min. After quenching with methanol, the PE was isolated to give 12.63 g (90 kg PE/g Ni). The melt index (190° C., 2160 g) was 0.11 dg/min. The branch content was 38.1 $CH_3$/1000 $CH_2$ by $^1H$ NMR (500 MHz, $Cl_2CDCDCl_2$, 120° C.). The peak melting temperature was 103° C. (63 J/g) by DSC on the second heating cycle (heat rate 10° C./min). The molecular weight by GPC (1,2,4-trichlorobenzene, 135° C., universal calibration as PE) was $M_w$ 164,000 with $M_w/M_n$ 2.23.

Tables 1, 2, and 3 summarize the numbered Examples of ethylene slurry polymerizations under various conditions using the General Polymerization Procedure as employed in Example 1. The lettered Comparative Examples followed the same procedure, except that 1,4-cyclohexadiene (CHD) was omitted and hydrogen (or nothing when no CTA was used) was introduced as a gas mixture (mole %) in ethylene. Isooctane was used in place of heptane on some occasions. Table 4 shows results obtained when other nickel complexes were used.

In all the Tables the alkylaluminum compound used was MMAO-7, and the ethylene pressures were 1.38 MPa in Table 1, 2.76 MPa in Table 2, and 690 kPa in Tables 3 and 4.

TABLE 1

| Ex. | Ni $\mu$M | Al/Ni Equiv. | CHD Equiv. | Temp. °C. | Time min | Yield g | Yield kg/g Ni | MI dg/min | Mw | Mw/Mn | Tm, peak °C. (J/g) | Branching $CH_3$/1000 $CH_2$ |
|---|---|---|---|---|---|---|---|---|---|---|---|---|
| 1 | 8 | 1100 | 4400 | 56 | 50 | 12.63 | 90 | 0.11 | 164,000 | 2.23 | 103 (63) | 38.1 |
| 2 | 5 | 1800 | 14,000 | 57 | 50 | 8.61 | 98 | 0.07 | 204,000 | 1.96 | 104 (74) | 26.2 |
| 3 | 5 | 1800 | 3500 | 57 | 30 | 12.41 | 140 | 0.2 | 154,000 | 2.07 | 81 (59) | 36.2 |
| 4 | 5 | 1800 | 1400 | 65 | 30 | 16.96 | 190 | 0.29 | 128,000 | 2.3 | 68, 106 (64) | 45.3 |
| 5 | 5 | 1800 | 720 | 65 | 30 | 14.3 | 160 | 0.72 | 110,000 | 1.9 | 78 (62) | 46 |
| 6 | 5 | 1800 | 340 | 65 | 30 | 17.66 | 190 | 1.02 | 95,200 | 1.98 | 66 (57) | 54 |
| A | 8 | 1600 | — | 50 | 7 | 13.34 | 95 | — | 429,000 | 2.63 | 113 (97) | 11 |
| B | 8 | 1600 | 0.075* | 60 | 15 | 11.7 | 83 | — | 303,000 | 2.28 | 113 (93) | 17.9 |
| C | 8 | 1600 | 0.125* | 60 | 12 | 8.66 | 61 | 0.12 | 179,000 | 1.92 | 100 (86) | 19.3 |
| D | 5 | 1200 | 1.9* | 68 | 30 | 5.6 | 62 | 3.7 | 64,600 | 2.18 | 110 (89) | 29.2 |

*Mole percent hydrogen.

TABLE 2

| Ex. | Ni $\mu$M | Al/Ni Equiv. | CHD Equiv. | Temp. °C. | Time min | Yield g | Yield kg/g Ni | MI dg/min | Mw | Mw/Mn | Tm, peak °C. (J/g) | Branching $CH_3$/1000 $CH_2$ |
|---|---|---|---|---|---|---|---|---|---|---|---|---|
| 7 | 5 | 1800 | 690 | 74 | 30 | 11.78 | 130 | — | 266,000 | 2.29 | 114 (90) | 19.7 |
| 8 | 6 | 1600 | 310 | 71 | 30 | 12.86 | 130 | 0.84 | 90,600 | 1.93 | 89 (53) | 38.5 |
| E | 5 | 2500 | — | 52 | 30 | 6.06 | 69 | — | 395,000 | 2.35 | 117 (103) | 7.0 |
| F | 5 | 1100 | 1.0* | 72 | 30 | 8.89 | 110 | 0.66 | 103,000 | 2.34 | 117 (104) | 18.9 |
| G | 5 | 1800 | 1.9* | 75 | 30 | 8.90 | 95 | 2.95 | 72,300 | 2.40 | 120 (118) | 17.7 |

*Mol percent $H_2$ in ethylene

TABLE 3

| Ex. | Ni μM | Al/Ni Equiv. | CHD Equiv. | Temp. °C. | Time min | Yield g | Yield kg/g Ni | MI | Mw | Mw/Mn | Tm, peak °C. (J/g) | Branching CH$_3$/1000 CH$_2$ |
|---|---|---|---|---|---|---|---|---|---|---|---|---|
| 9 | 5 | 1800 | 1400 | 66 | 30 | 6.43 | 140 | 0.39 | 127,000 | 2.37 | 67, 99 (42) | 62.5 |
| 10 | 4 | 2200 | 880 | 72 | 30 | 8.50 | 120 | 6.2 | 55,700 | 1.74 | 30 (30) | 83.1 |
| 11 | 4 | 2200 | 410 | 70 | 30 | 8.13 | 110 | — | 49,400 | 1.84 | 31 (39) | 94.5 |
| 12 | 5 | 1800 | 340$^a$ | 70 | 30 | 10.88 | 120 | 7.4 | 61,800 | 1.78 | 38 (36) | 80.4 |
| H | 5 | 2500 | — | 51 | 21 | 13.82 | 157 | — | 180,000 | 1.95 | 84 (43) | 29.5 |
| I | 5 | 1300 | 3* | 50 | 15 | 7.22 | 81 | 0.52 | 106,000 | 1.99 | 98 (97) | 27.4 |
| J | 5 | 1300 | 3* | 70 | 15 | 1.55 | 17 | — | 39,000 | 1.78 | 56 (28) | 74.0 |
| K | 5 | 1300 | 13* | 70 | 15 | 0.66 | 7 | — | 18,800 | 1.72 | 59 (30) | 71.3 |

$^a$Triphenylmethane.
*Mol % H$_2$ in ethylene.

TABLE 4

| Ex. | Ni Compound | Al/Ni Equiv. | CHD Equiv. | Temp. °C. | Time min | Yield g | Yield kg/g Ni | MI | Mw | Mw/Mn | Tm °C. (J/g) | Branching CH$_3$/1000 CH$_2$ |
|---|---|---|---|---|---|---|---|---|---|---|---|---|
| 13 | (XI) | 1900 | 370 | 70 | 30 | 7.63 | 92 | 30 | 39,200 | 2.14 | 58 (34) | 63.8 |
| 14 | (XIII) | 1500 | 300 | 70 | 60 | 6.35 | 61 | 0.84 | 68,500 | 1.92 | -4 (9) | 98.4 |
| 15 | (X) | 1900 | 380 | 60 | 60 | 6.03 | 73 | 0.03 | 235,000 | 2.2 | 13 (34) | 101.6 |
| 16 | (IX) | 1700 | 320 | 70 | 85 | 6.03 | 63 | 0.03 | 372,000 | 2.37 | -20 (19) | 130.7 |

What is claimed is:

1. A process for the polymerization of one or more polymerizable olefins, comprising the step of contacting, under polymerization conditions:

(a) said one or more polymerizable olefins and (b) an active polymerization catalyst comprising a complex of a neutral bidentate ligand of a metal selected from the group consisting of nickel, iron and cobalt, in the presence of a chain transfer agent comprising a compound selected from the group consisting of a compound of the formula (I)

(I)

and a triarylmethane of the formula R$^7$$_3$CH (II), wherein:

each of R$^1$, R$^2$, R$^3$, R$^4$, R$^5$ and R$^6$ is independently hydrogen, hydrocarbyl, or substituted hydrocarbyl, provided that any two of R$^1$, R$^2$, R$^3$, R$^4$, R$^5$ and R$^6$ vicinal to one another taken together may form a ring; and each R$^7$ is independently aryl or substituted aryl, provided that any two of R$^7$ taken together may form a ring.

2. The process as recited in claim 1, wherein the active polymerization catalyst comprises a nickel, iron or cobalt complex of a ligand of the formula (IV), (V), (VI) or (VII)

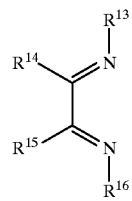

(IV)

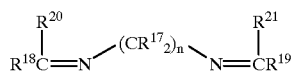

(V)

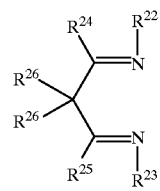

(VI)

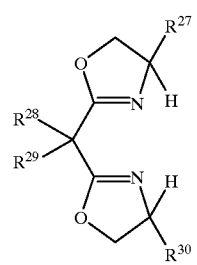

(VII)

wherein:

R$^{13}$ and R$^{16}$ are each independently hydrocarbyl or substituted hydrocarbyl, provided that the atom bound to the imino nitrogen atom has at least two carbon atoms bound to it;

R$^{14}$ and R$^{15}$ are each independently hydrogen, hydrocarbyl, substituted hydrocarbyl, or R$^{14}$ and R$^{15}$ taken together are hydrocarbylene or substituted hydrocarbylene to form a carbocyclic ring;

$R^{18}$ is hydrocarbyl or substituted hydrocarbyl, and $R^{20}$ is hydrogen, hydrocarbyl or substituted hydrocarbyl, or $R^{18}$ and $R^{20}$ taken together form a ring;

$R^{19}$ is hydrocarbyl or substituted hydrocarbyl, and $R^{21}$ is hydrogen, substituted hydrocarbyl or hydrocarbyl, or $R^{19}$ and $R^{21}$ taken together form a ring;

each $R^{17}$ is independently hydrogen, substituted hydrocarbyl or hydrocarbyl, or two of $R^{17}$ taken together form a ring;

$R^{22}$ and $R^{23}$ are each independently hydrocarbyl or substituted hydrocarbyl, provided that the atom bound to the imino nitrogen atom has at least two carbon atoms bound to it;

$R^{24}$ and $R^{25}$ are each independently hydrogen, hydrocarbyl, or substituted hydrocarbyl;

each $R^{26}$ is independently hydrogen, hydrocarbyl or substituted hydrocarbyl;

$R^{27}$ and $R^{30}$ are independently hydrocarbyl or substituted hydrocarbyl; and $R^{28}$ and $R^{29}$ are each independently hydrogen, hydrocarbyl or substituted hydrocarbyl.

3. The process as recited in claim 1, wherein the ligand is an alpha-diimine ligand.

4. The process as recited in claim 2, wherein the ligand is the ligand of the formula (IV).

5. The process as recited in claim 1, wherein the metal of active polymerization catalyst is nickel.

6. The process as recited in claim 3, wherein the metal of active polymerization catalyst is nickel.

7. The process as recited in claim 4, wherein the metal of active polymerization catalyst is nickel.

8. The process as recited in claim 1, wherein said one or more polymerizable olefins comprises ethylene.

9. The process as recited in claim 1, wherein the molar ratio of said chain transfer agent to said metal in the active polymerization catalyst is from about 1 to about 100,000.

10. The process as recited in claim 1, wherein more than one active polymerization catalyst is present.

11. The process as recited in claim 10, wherein said more than one active polymerization catalyst is selected from the group consisting of a Ziegler-Natta-type catalyst, a metal-locene-type catalyst and another late transition metal containing catalyst.

12. An improved process for the polymerization of one or more polymerizable olefins in the presence of, as an active polymerization catalyst, a complex of a neutral bidentate ligand of a metal selected from the group consisting of nickel, iron, and cobalt, and further in the presence of an effective amount of a chain transfer agent, wherein the improvement comprises using as a chain transfer agent a compound selected from the group consisting of a compound of the formula (I)

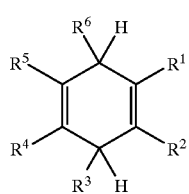

(I)

and a triarylmethane of the formula $R^7{}_3CH$ (II), wherein:

each of $R^1$, $R^2$, $R^3$, $R^4$, $R^5$ and $R^6$ is independently hydrogen, hydrocarbyl, or substituted hydrocarbyl, provided that any two of $R^1$, $R^2$, $R^3$, $R^4$, $R^5$ and $R^6$ vicinal to one another taken together may form a ring; and each $R^7$ is independently aryl or substituted aryl, provided that any two of $R^7$ taken together may form a ring.

13. The improved process as recited in claim 12, wherein the active polymerization catalyst comprises a nickel, iron or cobalt complex of a ligand of the formula (IV), (V), (VI) or (VII)

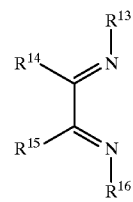

(IV)

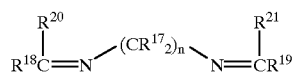

(V)

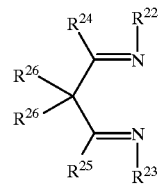

(VI)

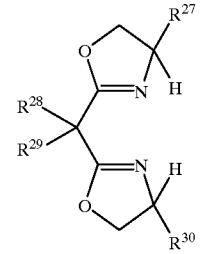

(VII)

wherein:

$R^{13}$ and $R^{16}$ are each independently hydrocarbyl or substituted hydrocarbyl, provided that the atom bound to the imino nitrogen atom has at least two carbon atoms bound to it;

$R^{14}$ and $R^{15}$ are each independently hydrogen, hydrocarbyl, substituted hydrocarbyl, or $R^{14}$ and $R^{15}$ taken together are hydrocarbylene or substituted hydrocarbylene to form a carbocyclic ring;

$R^{18}$ is hydrocarbyl or substituted hydrocarbyl, and $R^{20}$ is hydrogen, hydrocarbyl or substituted hydrocarbyl, or $R^{18}$ and $R^{20}$ taken together form a ring;

$R^{19}$ is hydrocarbyl or substituted hydrocarbyl, and $R^{21}$ is hydrogen, substituted hydrocarbyl or hydrocarbyl, or $R^{19}$ and $R^{21}$ taken together form a ring;

each $R^{17}$ is independently hydrogen, substituted hydrocarbyl or hydrocarbyl, or two of $R^{17}$ taken together form a ring;

$R^{22}$ and $R^{23}$ are each independently hydrocarbyl or substituted hydrocarbyl, provided that the atom bound to the imino nitrogen atom has at least two carbon atoms bound to it;

$R^{24}$ and $R^{25}$ are each independently hydrogen, hydrocarbyl, or substituted hydrocarbyl;

each $R^{26}$ is independently hydrogen, hydrocarbyl or substituted hydrocarbyl;

$R^{27}$ and $R^{30}$ are independently hydrocarbyl or substituted hydrocarbyl; and $R^{28}$ and $R^{29}$ are each independently hydrogen, hydrocarbyl or substituted hydrocarbyl.

14. The improved process of claim 12, wherein the ligand is an alpha-diimine ligand.

15. The improved process as recited in claim 13, wherein the ligand is the ligand of the formula (IV).

16. The improved process as recited in claim 12, wherein the metal of active polymerization catalyst is nickel.

17. The improved process as recited in claim 14, wherein the metal of active polymerization catalyst is nickel.

18. The improved process as recited in claim 15, wherein the metal of active polymerization catalyst is nickel.

19. The improved process as recited in claim 12, wherein said one or more polymerizable olefins comprises ethylene.

20. The improved process as recited in claim 12, wherein the molar ratio of said chain transfer agent to said metal in the active polymerization catalyst is from about 1 to about 100,000.

21. The improved process as recited in claim 12, wherein more than one active polymerization catalyst is present.

22. The improved process as recited 21, wherein said more than one active polymerization catalyst is selected from the group consisting of a Ziegler-Natta-type catalyst, a metallocene-type catalyst and another late transition metal containing catalyst.

* * * * *